United States Patent [19]

Takehara

[11] 4,426,660
[45] Jan. 17, 1984

[54] STYLUS FOR DETECTING SIGNALS RECORDED AS GEOMETRIC VARIATIONS AND METHOD FOR MAKING THE SAME

[75] Inventor: Hideaki Takehara, Yokohama, Japan

[73] Assignee: Victor Company of Japan, Limited, Yokohama, Japan

[21] Appl. No.: 235,713

[22] Filed: Feb. 18, 1981

[30] Foreign Application Priority Data

Feb. 19, 1980 [JP] Japan .................. 55-19385

[51] Int. Cl.³ ............................................. G11B 9/06
[52] U.S. Cl. ..................... 358/126; 358/151
[58] Field of Search ........ 369/126, 173, 151; 358/342; 204/192 N, 192 C, 192 CP

[56] References Cited

U.S. PATENT DOCUMENTS

| | | | |
|---|---|---|---|
| 3,843,846 | 10/1974 | Miller | 369/126 |
| 3,873,782 | 3/1975 | Palmer | 369/126 |
| 3,927,887 | 12/1975 | Oda et al. | 369/173 |
| 3,930,117 | 12/1975 | Clemens et al. | 369/126 |
| 3,945,902 | 3/1976 | Hawrylo et al. | 369/151 X |
| 4,052,738 | 10/1977 | Hosomi et al. | 369/126 |
| 4,105,213 | 8/1978 | Owaki et al. | 369/173 |
| 4,199,782 | 4/1980 | Wada et al. | 369/126 |

FOREIGN PATENT DOCUMENTS 52-44572  4/1977  Japan ........................ 204/192 N Primary Examiner—Bernard Konick
Assistant Examiner—Donald McElheny, Jr.
Attorney, Agent, or Firm—Lowe, King, Price & Becker

[57] ABSTRACT

A stylus for use in detecting signals as electrostatic capacitance variations of the information recorded in the form of geometric variations on a surface of a recording disc comprises a diamond body and a stylus electrode formed on a surface of the diamond body by depositing a conductive substance having a strong affinity to carbon and heating the deposited diamond body to an elevated temperature to allow the carbon atoms of the diamond body to diffuse into the deposited conductive region to form a carbide compound. Hafnium, titanium or tantalum is found suitable as the conductive substance.

2 Claims, 4 Drawing Figures

STYLUS FOR DETECTING SIGNALS RECORDED AS GEOMETRIC VARIATIONS AND METHOD FOR MAKING THE SAME

BACKGROUND OF THE INVENTION

The present invention relates to a stylus for detecting signals stored as capacitance variations in a recording medium, and in particular to a stylus having a deposited stylus electrode of a carbide compound and a method for making the stylus.

Conventional styluses for use in detecting signals as electrostatic capacitance variations recorded as geometric variations in a recording medium such as grooveless disc have an electrode bonded to one surface of an insulative supporting body formed of diamond or sapphire. The stylus of this type rests over several spiral tracks in which the signals are recorded. The electrode is machined so that its width substantially corresponds to the width of the track to read one information signal and the tracking signals on either side of it to keep the stylus on the right path as the disc spins at a high speed.

A problem that has been encountered and is yet to be solved is that the heat produced by contact with the spinning track causes the stylus electrode to separate from the support body due to relatively weak bonding between the electrode and the support body.

SUMMARY OF THE INVENTION

According to one aspect of the invention, a stylus for detecting signals recorded as capacitance variations in a recording medium comprises a body of diamond and a conductive layer of a carbide compound on a surface of the diamond body. The carbide compound has a melting point temperature higher than the temperature which would be reached by an electrical spark discharge produced as a result of slidable contact between the stylus tip and the surface of the recording medium which is spun at a considerably high speed. Preferred examples of the conductive substance found suitable are hafnium, titanium or tantalum. The carbide compound is formed by depositing the atoms of such a conductive substance on a polished surface of the diamond body such as by vacuum evaporation or sputtering or ion injection and the like until a desired thickness is attained, and then subjecting the stylus to heat treatment in a vacuum chamber to allow the carbon atoms of the diamond body to diffuse into the deposited conductive region.

According to a second aspect of the invention, a method for forming a conductive layer on a body of diamond comprises depositing a conductive substance having a strong affinity to carbon on a surface of the diamond body to form the conductive layer and heating the conductive layer and the diamond body in a vacuum chamber at an elevated temperature to allow the carbon atoms of the diamond body to diffuse into the conductive layer to form a carbide compound in the conductive layer. Preferably, the heat treatment be conducted at a temperature in range from 400° C. to 2200° C. for at least 10 minutes in a vacuum with a pressure lower than $10^{-5}$ Torr.

BRIEF DESCRIPTION OF THE DRAWINGS

The invention will be further described in detail with reference to the accompanying drawings, in which.

DETAILED DESCRIPTION

Figure 1:
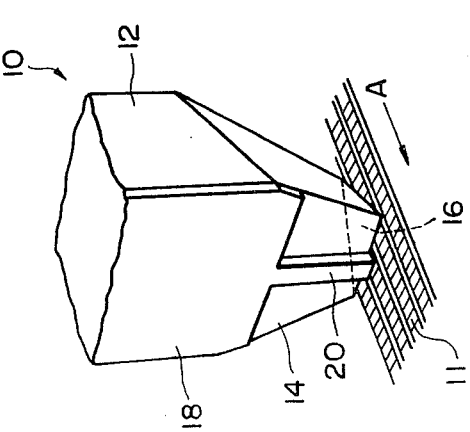
FIG. 1 is an illustration of a stylus of the invention resting over several tracks of a record medium.

In FIG. 1 a reproducing stylus 10 for grooveless capacitance discs is shown as resting over several spiral tracks 11 of a disc in which signals are stored as capacitance variations produced by minute pits. The stylus 10 comprises a diamond body 12 which is shaped to form a rear face 14 and a contact face 16 making contact with the track moving in the direction of the arrow A when in use. The contact face 16 has a width covering several tracks as shown and takes a triangular shape in this example. On the rear face 14 of the stylus 10 is the stylus electrode 18 which is provided in accordance with the present invention. The stylus electrode 18 has a downwardly extending strip 20 making contact with one track to read just one information signal and the tracking signals on either side of it to keep the stylus 10 on the right path by feeding current to a tracking error servomechanism, not shown.

The stylus electrode 18 is a conductive layer composed of a carbide compound. The carbon constituent of the compound is one that forms part of the diamond body 12 and the conductive constituent is one having a strong affinity to diamond such as hafnium, titanium or tantalum. The conductive substance is selected so that the carbide compound has a high melting point and a low electrical resistivity. Examples of the conductive substance found suitable are hafnium, titanium or tantalum. Table I shows the physical properties of hafnium and its chemical compounds.

TABLE I

| Substances | Melting point (°C.) | Resistivity ($10^{-6}$ohm-cm) |
|---|---|---|
| Diamond | 3700 | — |
| Hafnium | 2230 | 43 |
| Hafnium Carbide | 3887 | 60 |
| Hafnium Oxide | 2777 | — |

If hafnium is used as the conductive substance to form a hafnium carbide stylus electrode 18, the resistivity of the electrode is substantially as low as that of pure hafnium and its melting point is well above the temperature which would be reached by spark discharge.

Acording to the present invention, the stylus electrode 18 is made in the following processes. First, a diamond body is cut out from a raw diamond block and shaped into a suitable form. One of the surfaces of the diamond body is polished to a mirror finish to serve as the face 14.

The electrode 18 is formed on the face 14 by depositing hafnium, or titanium or tantalum by vacuum evaporation, sputtering or ion plating, or by ion injection technique. The deposition continues until a thickness of 3000 Angstrom is reached. A layer of photoresist is evenly applied to the deposited conductive layer and then exposed to light through a mask of a desired electrode pattern. Subsequently, the photoresist layer is developed and undesired portions of the deposited conductive layer are removed by the etching method. The diamond body 12 is then shaped to form the contact face 16. Heat treatment is then conducted within a vacuum chamber having a pressure lower than $10^{-5}$ Torr at a temperature in a range from 400° C. to 2200° C., preferably at 840° C., for at least 10 minutes. This heat treatment allows the carbon atoms of the body 12 to diffuse into the deposited conductive layer to form a carbide compound. The heat treatment may also be carried out immediately after the deposition process prior to the etching process.

Figure 3:
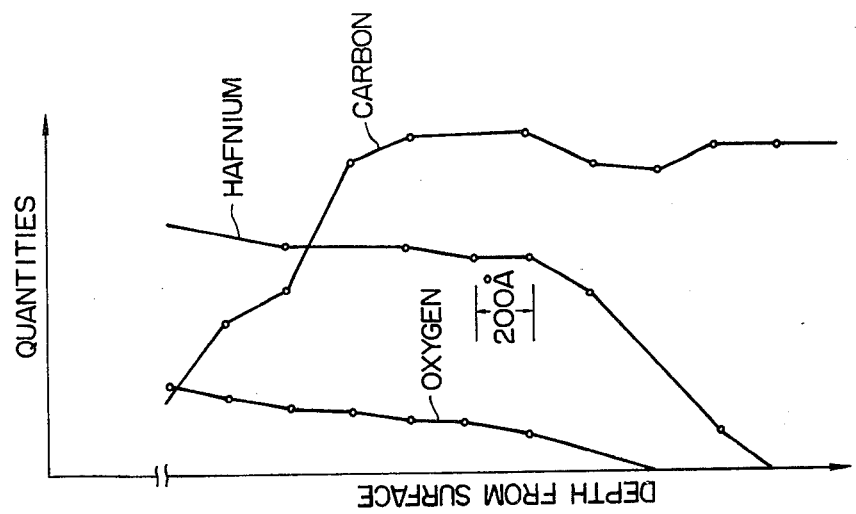
FIG. 3 is a graphic illustration of an Auger electron spectral analysis conducted with respect to the stylus electrode after the heat treatment.
Figure 2:
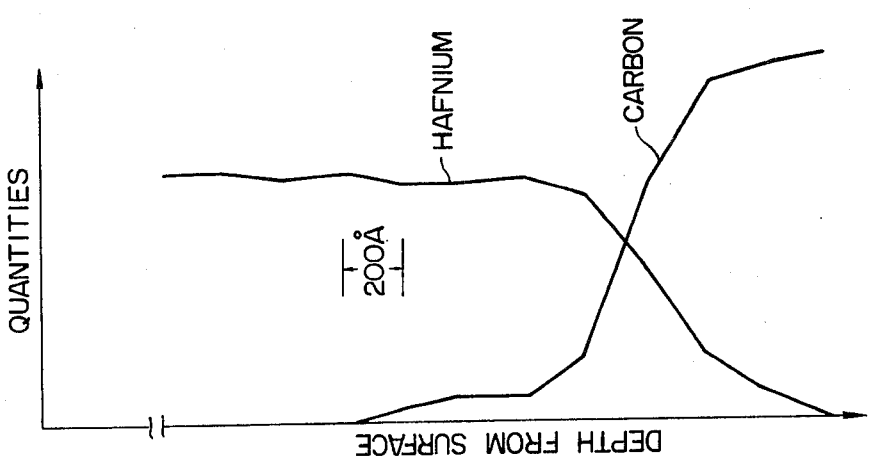
FIG. 2 is a graphic illustration of an Auger electron spectral analysis conducted with respect to the stylus electrode prior to heat treatment.
Figure 4:
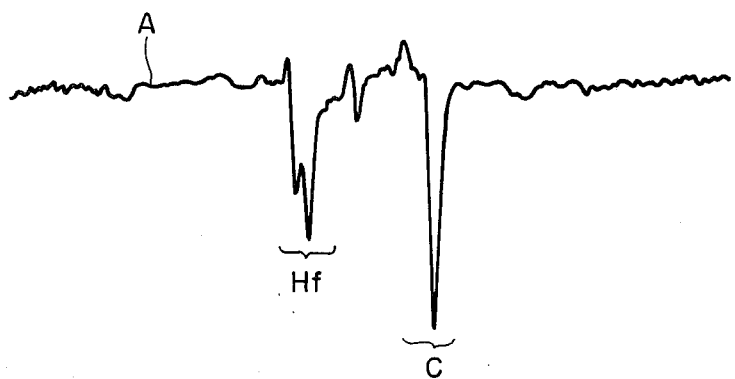
FIG. 4 is a graphic illustration of Auger electron spectral analyses conducted with respect to an etched surface of the stylus to confirm the formation of a carbide compound.
Figure 4:
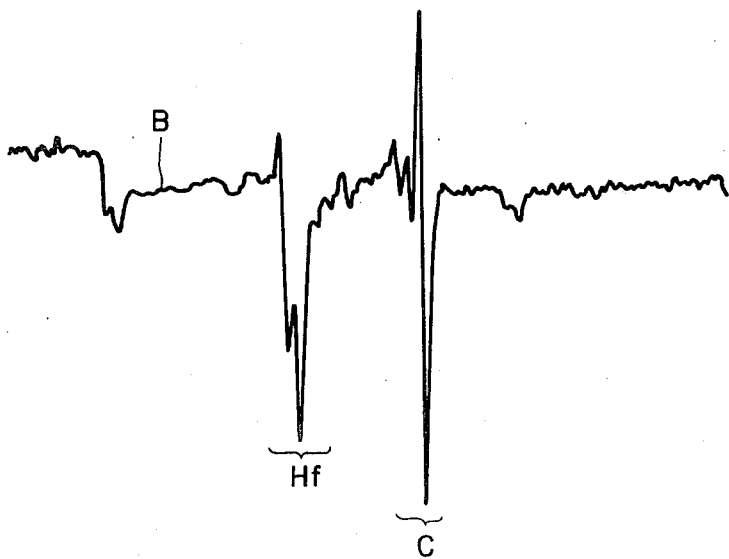

FIG. 2 is an illustration of the distribution of hafnium and carbon atoms measured prior to the heat treatment from the surface of the stylus electrode 18 by the Auger electron spectral analysis, while FIG. 3 is an illustration of the same Auger spectral analysis after the heat treatment is carried out. By comparison between FIGS. 2 and 3 it is apparent that carbon atoms diffuse into the deposited hafnium layer by the heat treatment. In FIG. 3 it is noted that a trace of oxygen atoms is found to exist in the deposited layer. This is accounted for by the presence of residual oxygen gas in the reaction chamber which combines with the deposited hafnium during the heat treatment to form hafnium oxide. Since the oxide compound has a relatively high resistivity, it is preferable that the amount of residual oxygen in the reaction chamber be as small as possible. The formation of hafnium carbide in the stylus electrode 18 was further confirmed by Auger electron spectral analyses conducted after etching the electrode 18 to the boundary between the deposited layer and the underlying diamond body. A curve A of FIG. 4 is the result of the analysis derived prior to the heat treatment, while curve B is the result that is derived after the heat treatment. By comparison between the curves A and B, the spectral line corresponding to the carbon atom in curve B differs from that of curve A. It is believed that this variation in spectral line configuration has resulted from the combination of hafnium atoms with the carbon atoms of the diamond body 12, although the hafnium carbide (HFC) thus formed is not necessarily a chemical composition in terms of stoichiometry.

Because of the strong affinity that exists between carbon and the above-mentioned conductive substances, the stylus electrode 18 made according to the invention is not subject to separation from the supporting diamond body 12 and because of the high melting point of carbide compound the electrode is capable of withstanding high temperature conditions which it encounters when in use.

What is claimed is:

1. A stylus for detecting signals recorded as geometric variations in a recording medium, comprising a body of diamond having an elongated rear surface extending from the bottom thereof where in use it contacts said medium and a conductive layer of a carbide compound on said elongated rear surface, said carbide compound being formed by depositing a conductive substance having a strong affinity to carbon on the surface of said diamond body and heating said conductive layer and said diamond body in a vacuum at a temperature in a range between 400° C. to 2200° C. to allow the carbon atoms of said diamond body to diffuse into said conductive layer.

2. A stylus as claimed in claim 1, wherein said conductive substance is halfnium, titanium or tantalum.

* * * * *